United States Patent [19]
Alinari

[11] 3,777,573
[45] Dec. 11, 1973

[54] INSTRUMENT FOR INDICATING THE LENGTH AND NUMBER OF DECOMPRESSION PAUSES IN UNDERSEA DIVING

[76] Inventor: Carlo Alinari, Corso Vittorio Emanuele II, no. 200, Turin, Italy

[22] Filed: June 28, 1972

[21] Appl. No.: 266,917

[30] Foreign Application Priority Data
Aug. 3, 1971  Italy .................. 69610-A/71

[52] U.S. Cl. ............................. 73/432 R, 73/300
[51] Int. Cl. ........................................ G01f 23/14
[58] Field of Search .................... 73/432 R, 299, 300

[56] References Cited
UNITED STATES PATENTS
3,463,015  8/1969  Gulino et al. .................. 73/299
FOREIGN PATENTS OR APPLICATIONS
735,170  5/1966  Canada ........................ 73/432

Primary Examiner—Donald O. Woodiel
Attorney—Richard C. Sughrue et al.

[57] ABSTRACT

An instrument for indicating the decompression pauses to be observed by an ascending diver, and the duration of these pauses, is according to this invention provided with a deformable chamber subjected to the ambient pressure and filled with liquid, this chamber communicating via a calibrated tube with a spring-loaded hydraulic accumulator, so that the liquid displaced through the tube is dependent upon the ambient pressure acting on the deformable chamber and the spring loading of the accumulator. An indicator is connected to the hydraulic accumulator to indicate on a graduated scale the pressure in said accumulator and therefore the volume of liquid displaced through the tube.

1 Claim, 12 Drawing Figures

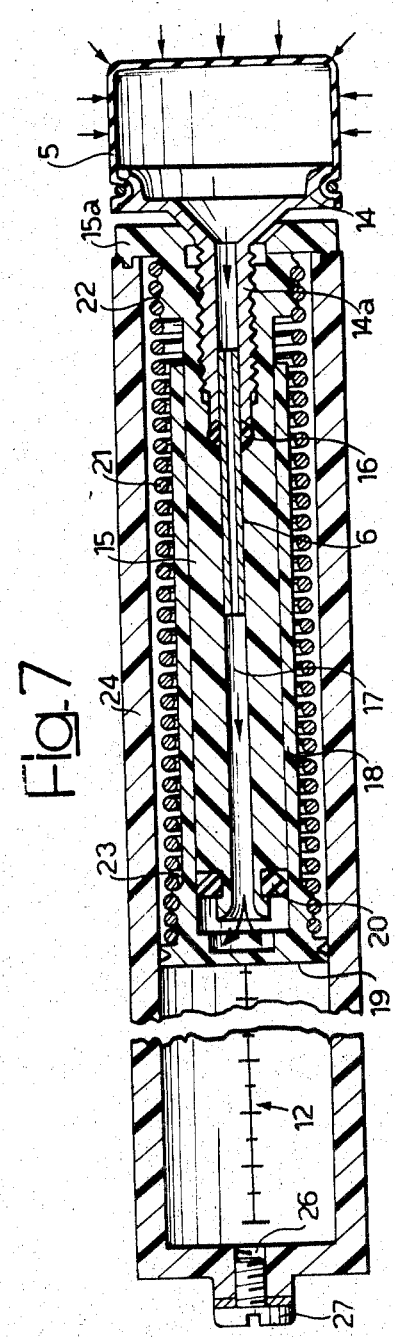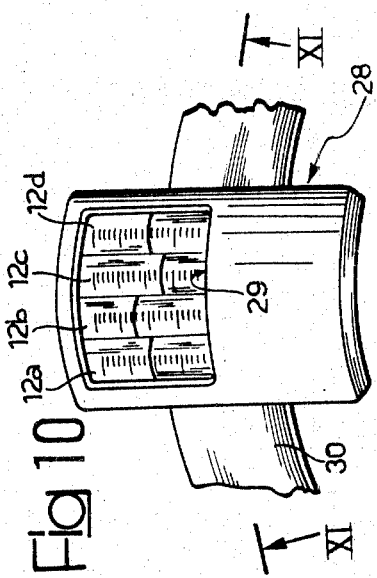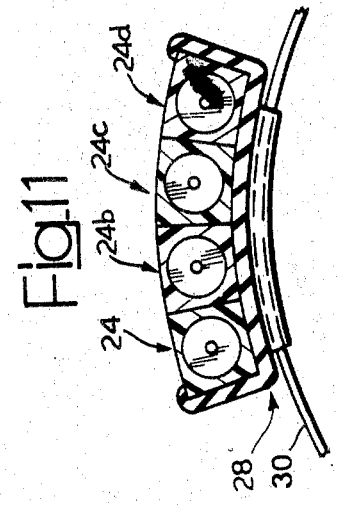

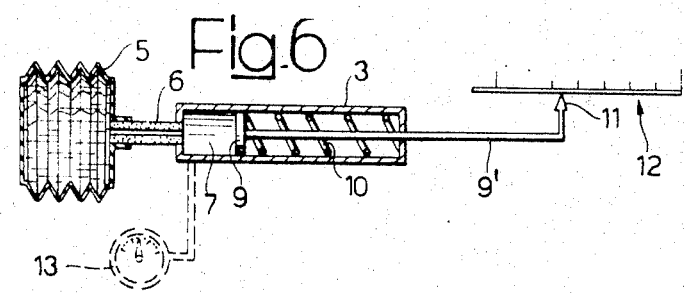
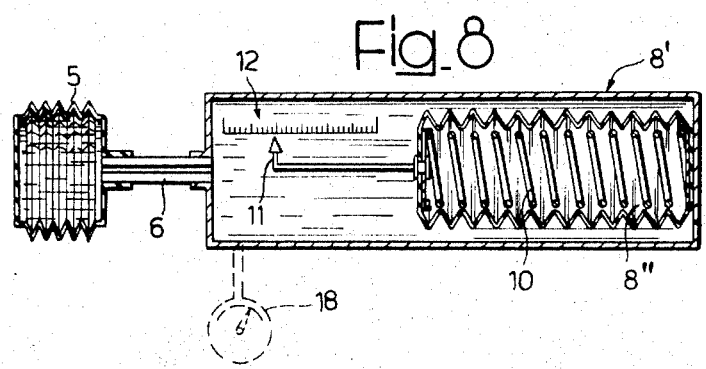
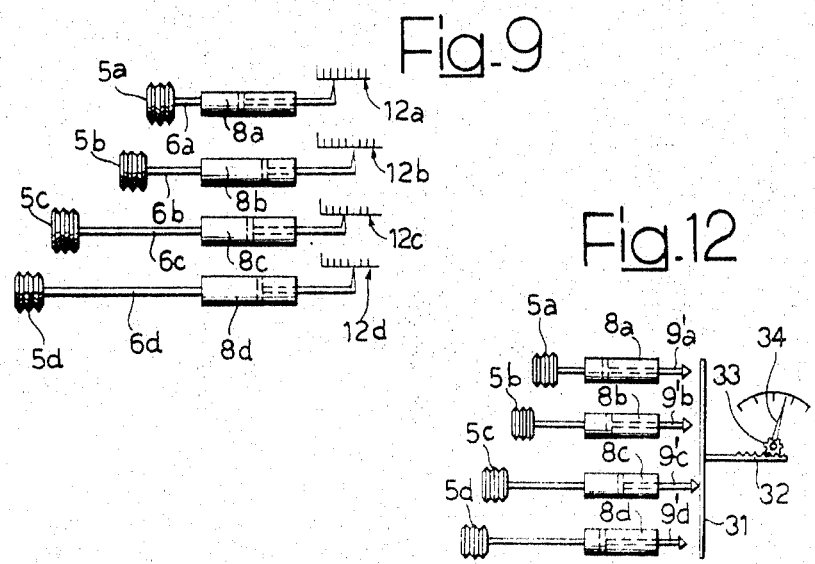

INSTRUMENT FOR INDICATING THE LENGTH AND NUMBER OF DECOMPRESSION PAUSES IN UNDERSEA DIVING

The present invention relates to decompression meters and particularly to instruments for underwater immersion able to signal the number of decompression pauses which a diver must necessarily observe when ascending from a certain depth of water to the surface, and the duration of such pauses.

BACKGROUND OF THE INVENTION

It is known that during immersion in water, using air respirators, the tissues of the human body absorb nitrogen according to an exponential law, in accordance with which the nitrogen content in the tissues increases progressively with increasing depth of immersion and increasing immersion time. The decompression pauses observed upon surfacing have the purpose of allowing nitrogen to drain off from the body tissues to prevent the well known and damaging effects of embolism.

To calculate the decompression pauses which must be observed by an ascending diver suitable reference tables are used to which reference is made to calculate, with the aid of a depth gauge and clock, the length of each pause and the number of successive decompression pauses as a function of the maximum depth attained and the time passed at such depth. Such reference tables, besided being inconvenient to use, are imperfect in appliaction because the data which they contain refer to specific times elasped at a constant depth, whilst in practice a diver does not remain continuously at a constant depth.

The known reference tables are compiled starting from the assumption that the human tissues absorb nitrogen and release it according to exponential laws of the form expressed by the formula $$p = P \cdot e^{-kt} \quad (1)$$

in which $k$ = a constant of elimination, or absorption, $e$ = base of the natural logarithms, and $t$ = time elapsed.

Human tissue may be characterised on the basis of a half-period T defined as the time in minutes which elapses before the pressure of nitrogen p in the tissue considered, exposed to a pressure P, reaches the value P/2. This half-period T is given in the reference tables and is equal and constant both for absorption and release of nitrogen. The reference tables are calculated for different specific types of tissues with half-periods of 5, 10, 20, 40, 80, 120, 160, 200 and 240 minutes.

In compiling the known reference tables, the various decompression rates are calculated according to the critical ratio concept established by Haldane in 1908, according to which the total superficial area of tissue may increase without the phenomenon of embolism occuring up to an amount which satisfies the relation:

$$\frac{\text{absolute pressure of nitrogen in the tissue}}{\text{absolute external pressure at the depth considered}} \leq \rho$$

wherein $\rho$ is the critical ratio. Naturally the value of the critical ratio is not constant, but varies with the depth considered and the tissue considered; the average value of $\rho$ is about 2/1.

From the earlier Patent of the Applicant it is known to provide an instrument for indicating the number and duration of decompression pauses, based upon the use of a deformable first chamber sensitive to the ambient pressure, connected to a rigid-walled second chamber through a calibrated conduit, both chambers being filled with a gaseous fluid such as, for example, air. The second chamber is connected to a pressure measuring device. The external ambient hydrostatic pressure reduces the volume of the deformable first chamber, compelling the gas to pass into the second chamber through the calibrated conduit so as to increase the pressure in said second chamber, this pressure being indicated by the measuring device with reference to a starting pressure which may be the atmospheric pressure at the surface of the water. In practice the measuring device is provided with an experimental scale which indicates the number of decompression pauses, conforming as closely as possible to the values supplied by the aforesaid reference tables.

An object of the present invention is to provide an improved instrument which represents analogically a tissue type having a behaviour corresponding exactly to the formula (1) both in the absorption phase and in the discharge phase, which is of simple and strong construction, taking up minimal space.

It is also an object of the invention to provide an instrument as aforesaid which can be associated readily with other similar instruments to form a composite instrument with which it is possible to monitor the behaviour of a plurality of tissues of the human body having different characteristics, so as to have a comprehensive indication corresponding to that indicated by the decompression tables.

SUMMARY OF THE INVENTION

According to the present invention there is provided an instrument for indicating the depth and duration of the decompression pauses to be observed by an ascending diver, the instrument including a deformable chamber subject to the external ambient pressure and filled with liquid, characterised in that an hydraulic accumulator, loaded by resilient means having linear deformation characteristics from zero to a maximum value, communicates via a calibrated tube with the deformable chamber in such a manner that the rate of displacement of liquid in either direction between the deformable chamber and said hydraulic accumulator is determined by the ambient pressure acting on the deformable chamber and by the reaction of the resilient means loading the accumulator, and in that means are provided for indicating upon a graduated scale the pressure in the accumulator, which pressure is proportional to the displacement of the movable part of the said accumulator and, therefore, to the volume of liquid displaced through the said calibrated tube.

The said indicator means provide an indication of the size of the necessary decompression pauses. The instrument in fact demonstrates that in practive the absroption and discharge of nitrogen in human tissue practice follow absorption curves complying with the formula $p = P \cdot e^{-kt}$. It is therefore possible to provide a deformable instrument reproducing exactly the calculation previously effected by means of decompression tables.

In one embodiment of the invention the hydraulic accumulator comprises a chamber defined within a rigid-walled cylinder the movable part of the accumulator comprising a piston loaded by a spring constituting said resilient means. Alternatively, the movable part of the hydraulic accumulator may comprise bellows or a corrugated metal diaphragm either with or without a biasing spring, or other deformabel wall.

BRIEF DESCRIPTION OF THE DRAWINGS

The invention will now be described, by way of non-limiting example, with reference to the accompanying drawings, in which:

FIG. 6 is a diagrammatic axial section of an instrument according to one embodiment of this invention;

FIG. 7 is an axial section on an enlarged scale of an instrument according to a practical embodiment of the invention;

FIG. 8 is a diagrammatic axial section of an instrument according to a variant of the embodiment of FIG. 6;

FIG. 9 is a diagrammatic section illustrating a composite instrument formed by a plurality of instruments of the type shown in FIG. 6;

FIG. 10 is a diagrammatic perspective view of a plurality of instruments according to this invention mounted in a single housing;

FIG. 11 is a transverse section on an enlarged scale made along line XI—XI of FIG. 10, and FIG. 12 is a composite instrument comprising a variant of that shown in FIG. 9.

THE ILLUSTRATED PRIOR ART

Figure 2:
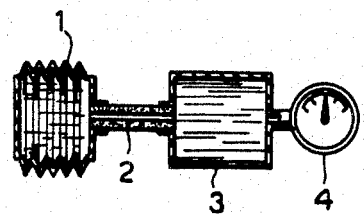
FIG. 2 is a diagrammatic longitudinal section of a known instrument for indicating decompression pauses for a diver.

A known instrument for indicating decompression pauses for an ascending diver is illustrated in FIG. 2 and comprises a bellows 1 connected through a small calibrated tube 2 or ceramic pipe to a rigid-walled chamber 3 the internal pressure in which is measured by a manometer 4. The scale of the manometer 4 is calibrated experimentally and indicates the depths at which decompression pauses are required, and, therefore, the rate at which a diver may surface from a given depth without risking embolism.

Figure 3:
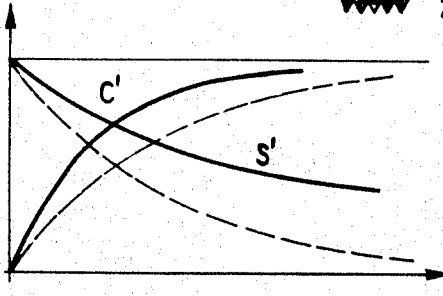
FIG. 3 is a diagram similar to that of FIG. 1 showing the curves of absorption and discharge indicated characteristic of the instrument of FIG. 2.

Naturally this instrument may serve only for times of submersion and depths which are not excessive inasmuch as the instrument is calibrated on the basis of an average tissue. An improvement in this instrument, for example providing a group of similar instruments each calibrated for a different tissue appears to be impossible since the apparatus described does not behave in practice according to symmetrical absorption and discharge curves according to the exponential formula $p = P \cdot e^{-kt}$: as shown in FIG. 3, the absorption curve $C'$ is steeper than the theoretical one and the discharge curve $S'$ is less steep than the theoretical one, both theoretical curves being shown by broken lines.

Figure 4:
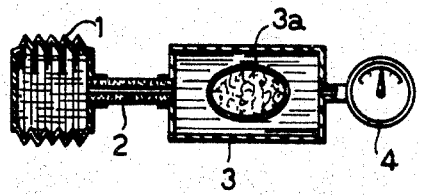
FIG. 4 is a diagrammatic longitudinal section of another known instrument for indicating the rates of decompression.
Figure 5:
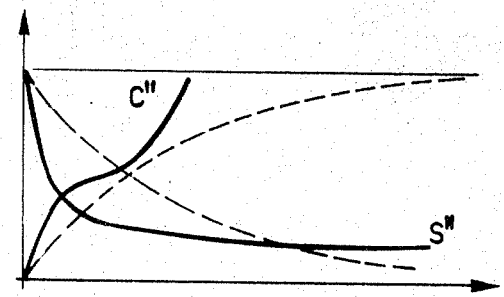
FIG. 5 is a diagram similar to those of FIGS. 1 and 3, showing the absorption and discharge curves characteristic of the instrument shown in FIG. 4.

In a variation proposed in the abovementioned patent an apparatus was proposed making use of an intermediary fluid. Such a modified instrument is shown in FIG. 4, in which the rigid-walled chamber 3 contains a gas-filled flexible walled capsule 3a. The bellows 1 and the chamber 3 are filled with a non-compressible fluid. In this instrument, also, the external hydrostatic pressure produces an identical pressure in the fluid contained in the bellows 1, fluid being therefore forced through the calibrated tube 2 into the chamber 3 to cause an increase in the pressure in the chamber 3 as measured by the manometer 4. The air contained in the capsule 3a will, however, be compressed, storing energy which will be released as the external pressure decreases upon ascent from a depth. This type of apparatus lends itself even less than that of FIG. 2 for use with different tissues. In fact the absorption curve $C''$ and discharge curve $S''$ for this instrument (FIG. 5) as far removed from the theoretical curves, shown in broken outline. This is due to the fact that the total quantity of the liquid in the instrument is substantially constant whilst the reaction of the energy accumulator constituted by the capsule 3a varies greatly with the compression of the latter. In fact the pressure of the liquid in the capsule varies in accordance with the laws of Boyle and Mariotte in a hyperbolic manner.

DESCRIPTION OF THE ILLUSTRATED EMBODIMENTS OF THE INVENTION

An instrument according to this invention is shown in FIG. 6 and comprises a deformable chamber 5 constituted by a bellows or lug of rubber or similar material connected by a calibrated tube 6 to a rigid-walled hydraulic accumulator chamber 7 of variable volume defined in a cylinder 8. A piston 9 slides fluid-tightly in the cylinder 8 and is acted upon by a helical spring 10 housed in the cylinder 8. The piston 9 is integral with a shaft 9' which terminates outside the cylinder 8 in a movable index 11 which moves relative to a graduated scale 12. The two intercommunicating chambers 5 and 7 are filled with liquid, preferably a liquid of high viscosity which under the influence of a pressure difference between the chambers 5 and 7, runs very slowly from one chamber to the other.

Figure 1:
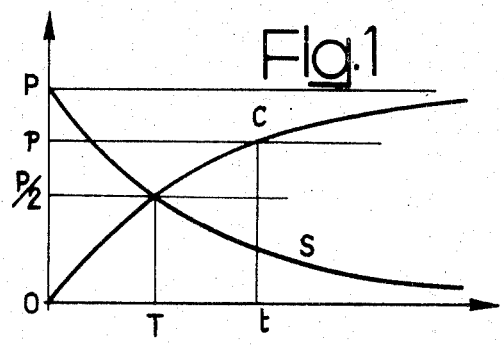
FIG. 1 is a diagram representing graphically the theoretical exponential curves of absorption and discharge of nitrogen in typical human tissue, corresponding to the previously stated formula (1)

When the instrument is immersed in water the external hydrostatic pressure compresses the chamber 5 and forces liquid therefrom into the chamber 7, overcoming the resistance offered by the calibrated tube 6. Little by little as the liquid passes into the chamber 7, the piston 9 moves, loading the spring 8. The movement of the piston 9 follows a law analogous to that of the absorption of nitrogen in human tissue under immersion conditions. The behaviour of the instrument, that is, the movement of the index 11 follows closely the theoretical absorption curve C shown in the diagram of FIG. 1.

In the ascent phase as the hydrostatic pressure acting on the chamber 5 gradually decreases, the spring 8 slowly moves the piston 9 and returns liquid from chamber 7 to the chamber 5 moving the index 11 in the opposite direction along the scale 12. In this phase the behavoir of the instrument follows exactly the theoretical discharge curve S and is perfectly symmetrical with respect to the absorption curve c. The scale 12 is calibrated on the basis of the pressures in the chamber 7 and on the basis of the critical relations desired and will indicated directly and in succession the depths at which decompression pauses must be effected during the ascent of a diver.

The indication of the instrument is proportional to the restriction presented by the calibrated tube 6, and this corresponds exactly to the behaviour of a specific type of tissue of the human body; by varying the flow restriction (i.e. the cross section) and the length of the tube 6 it is possible to approximate the behaviour of the instrument to that of several tissues. Thus a battery of instruments may be provided as depicted in FIG. 9, in which the chambers 5 and 7 of the instruments are the same and only the calibrated tubes 6a, 6b, 6c, 6d and the loadings of the individual springs 10 are different. There will normally be four different sets of behaviour, indicated by four different instruments, for a given pressure and duration of immersion, corresponding to four typical tissues of the human body. By reading all the instruments, the diver during ascent will be able to understand the effective conditions of his tissues and behave accordingly, in order to avoid embolism phenomena.

FIG. 7 shows a practical embodiment of an instrument according to the invention in which the deformable chamber is constituted by a flexible cap 5 of rubber or the like sealingly attached to a rigid funnel member 14 which is integral with a tubular externally threaded element 14a. A tubular body 15 is screwed on to the threaded element, the body 15 having a bore 17 containing a calibrated tube 6 through which the cap 5 communicates with the bore 17 of the body 15. A fluid-tight seal 16 is inserted between the tubular element 14a, the internal surfaces of the body 15, and the adjoining outer surfaces of the tube 6.

The tubular body 15 is surrounded by a relatively slidable tubular sleeve 18, closed at one end by a transverse end wall 19 and fluid-tightly coupled to the tubular body 15 by means of an annular packing 20 which surrounds the end of the body 15 adjacent the end wall 19. A helical spring 21 surrounds the sleeve 18 coaxially, one end of the spring being anchored in a series of circumferential helical grooves 22 in the outer surface of an enlarged part of the tubular body 15 at the end of the latter adjacent the cap 5. The other end of the spring 21 is anchored in a series of similar helical grooves 23 in the outer surface of the tubular sleeve 18 adjacent the end wall 19.

A tubular body 15 is furnished with an external annular flange 15a to which a transparent tubular outer casing 24 is attached. The casing 24 carries a graduated scale 12. The casing 24 has at its end remote from the flange 15a an end wall with a central screw-threaded hole closed by a screw 28.

The deformable chamber constituted by the cap 5 and the bore 17 of the tubular body 15 are filled with liquid of high viscosity which, under the influence of a pressure difference, flows slowly through the tube 6 between the cap 5 and the chamber defined by the sleeve 18, the end wall 19 and the bore 17.

Upon immersion of the instrument the hydrostatic pressure acting upon the cap 5 forces liquid to pass slowly through the tube 6 and the bore 17 so as to act upon the movable piston constituted by the end wall 19, causing movement, towards the left as viewed in FIG. 7, of the tubular sleeve 18 against the action of the spring 21, which stretches in this phase. The end wall 19 constitutes an externally visible index which moves relative to the graduated scale 12 to indicate the depths at which decompression pauses are to be observed during the ascent of a diver. During ascent the force exerted by the spring 21 draws the sleeve 18 to the right, as viewed in FIG. 7, while liquid flows again into the cap 5.

The spring 21 may be calibrated readily by screwing or unscrewing it respectively relative to the helical grooves 22, 23.

It is desirable for best results to minimise friction between the movable parts and the fixed parts of the apparatus without reducing the fluid-tightness of the seals between the sleeve 18, the body 15 and the casing 24.

The scale 12 of the instrument will be graduated so as to give the critical readings.

The tubular casing 24 should in practice be fairly large in order that the air trapped in the casing, when compressed by the displacement of the end wall 19 may not modify appreciably the linearity of the relationship between the force exerted on the sleeve 18, due to the spring, and the displacement of the sleeve. Moreover the air contained in the casing 24 varies in pressure according to the ambient temperature and this is a cause of other slight errors.

In order to obviate these errors a modification is proposed, shown diagrammatically in FIG. 8, having an hydraulic accumulator constituted by a rigid-walled chamber 8' containing an evacuated vessel 8" having at least one elastically deformable wall constituted by bellows as shown, or by an elastically deformable diaphragm. A movable index 11 is carried by a displaceable wall of the vessel 8" and a helical spring 10 is housed within the vessel 8". The chamber 8' has a rigid transparent cylindrical wall bearing a calibrated scale 12 relative to which the index 11 moves, the interior of the chamber 8' communicating with a flexible-walled chamber 5 through a calibrated tube 6. During operation of this instrument no air compression occurs and the force acting on the displaceable wall of the vessel 8" is strictly proportional to the displacement of the latter. This instrument is, moreover, not influenced by changes of ambient temperature.

FIGS. 10 and 11 show a compound instrument made up of a battery of four instruments of the kind shown in FIG. 7, each having outer casings 24a, 24b, 24c, 24d of rectangular or even quadrilateral cross-section, facilitating the mounting of the said casings side-by-side in, for example, a housing 28 fitted with a window 29 for reading the scales 12a, 12b, 12c, 12d of the instruments. The housing 28 may carry a band or strap 30 for attachment to the wrist of a user.

The example illustrated in FIGS. 10 and 11 has a battery of four instruments, adapted to be inserted in a housing carried on the arm of a user. It is possible, however, to use larger housings, not for arm or wrist mounting, for attachment to the user's body by other means.

Rather than having a battery of instruments with a multiple scale, that is, an individual scale for each instrument, a composite instrument may be provided as diagrammatically represented in FIG. 12, in which the movable shafts 9'a, 9'b, 9'c, 9'd of the respective hydraulic accumulators of the individual instruments, act upon a single transverse plate 31 attached to a rack 32 which cooperates with a toothed pinion 33 to which is fixed a movable pointer 34. The pointer 34 will indicate the position of the piston shaft which shows the highest accumulator pressure and can be read from a single scale.

Readings of the decompression pauses could also be given, as shown in FIGS. 6 by broken lines, by a manometer 13 connected to the chamber 7 of a variable volume to signal the pressure in the said chamber.

It will be appreciated that the manner of actuation and the constructional details of embodiments of the invention may be widely varied with respect to what has been described and illustrated without departing from the scope of this invention.

I claim:

1. An instrument for indicating the depth and duration of the decompression pauses to be observed by an ascending diver of the kind including a deformable chamber subject to the external ambient ambient pressure and filled with liquid, said instrument comprising a hydraulic accumulator having an accumulator chamber defined at least in part by a movable member, resilient means loading said accumulator and having linear deformation characteristics from zero to a maximum value, a calibrated tube interconnecting said deformable chamber and said accumulator, the rate of displacement of fluid in either direction through said tube being determined by the ambient pressure acting on the deformable chamber and by the reaction of said resilient means loading the accumulator and indicator means having a graduated scale upon which the pressure in the accumulator is indicated, said pressure being proportional to the displacement of the movable member of said accumulator and therefore, to the volume of liquid displaced through said calibrated tube, said instrument further comprising a tubular body connected to said deformable chamber through said calibrated tube, a relatively slidable tubular sleeve having a transverse end wall closing one end and surrounding said tubular body to define therewith the hydraulic accumulator chamber, said transverse end wall constituting a movable index, a transparent casing enclosing said sleeve and provided with said graduated scale, said index being movable relative to said scale to indicate the pressure in said accumulator chamber, said resilient means comprising a helical spring under tension acting upon said sleeve and including respective helical grooves in the external surface of the sleeve and said tubular body, the ends of said spring engaging said helical grooves adjustably to permit regulation of the spring loading.

* * * * *